(12) United States Patent
DeZorzi (10) Patent No.: US 6,518,875 B2
(45) Date of Patent: Feb. 11, 2003

(54) APPARATUS AND METHOD FOR SENSING A CONDITION OF A VEHICLE TIRE

(75) Inventor: Timothy DeZorzi, South Lyon, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/885,564

(22) Filed: Jun. 19, 2001

(65) Prior Publication Data

US 2002/0075144 A1 Jun. 20, 2002

Related U.S. Application Data (63) Continuation of application No. 09/467,400, filed on Dec. 20, 1999, now abandoned.

(51) Int. Cl.[7] .............................................. B60C 23/02
(52) U.S. Cl. ...................... 340/442; 340/438; 340/445; 340/447; 340/531; 340/539; 340/825.69
(58) Field of Search ................................. 340/442, 438, 340/445, 447, 531, 539, 425.5, 448, 444, 572.4, 825.69

(56) References Cited

U.S. PATENT DOCUMENTS

| 4,117,452 A | * | 9/1978 | Synder et al. ............. 340/447 |
| 4,311,985 A | | 1/1982 | Gee et al. |
| 4,510,484 A | * | 4/1985 | Snyder ....................... 340/447 |
| 5,055,826 A | | 10/1991 | Ballyns |
| 5,061,917 A | | 10/1991 | Higgs et al. |
| 5,285,189 A | * | 2/1994 | Nowicki et al. ............. 340/447 |
| 5,335,540 A | | 8/1994 | Bowler et al. |
| 5,500,637 A | | 3/1996 | Kokubu |
| 5,505,080 A | * | 4/1996 | McGhee ..................... 73/146.5 |
| 5,559,484 A | | 9/1996 | Nowicki et al. |
| 5,774,048 A | | 6/1998 | Achterholt |
| 5,963,128 A | | 10/1999 | McClelland |
| 6,232,875 B1 | * | 5/2001 | Dezorzi ....................... 340/442 |

FOREIGN PATENT DOCUMENTS

| WO | WO 9615919 | 5/1996 |
| WO | WO 9700784 | 1/1997 |

* cited by examiner

Primary Examiner—Daniel J. Wu
Assistant Examiner—Daniel Prévil
(74) Attorney, Agent, or Firm—Tarolli, Sundheim, Covell, Tummino & Szabo L.L.P.

(57) ABSTRACT

A tire condition sensor module (14) for a vehicle (10) comprises at least one actuatable tire condition sensor (78, 84, 88) for sensing a tire condition of an associated vehicle tire (20) and a motion detector (32) for detecting movement of the associated vehicle tire (20). The module (14) further includes a transmitter (44) for transmitting a tire condition indicating signal having a characteristic based on the sensed tire condition signal. A controller (74) controls actuation of the tire condition sensor (78, 84, 88) and the transmitter (44). The controller (74) is continuously energized and has first and second operating modes. The controller (74) operates in the first operating mode when movement of the associated tire (20) is greater than a predetermined value and operates in the second operating mode when movement of the associated tire (20) is less than the predetermined value.

17 Claims, 6 Drawing Sheets

APPARATUS AND METHOD FOR SENSING A CONDITION OF A VEHICLE TIRE

This application is a continuation of copending application(s) application Ser. No. 09/467,4000 filed on Dec. 20, 1999, now abandoned.

TECHNICAL FIELD

The present invention relate s to an apparatus and method for detecting a condition of a vehicle and, more particularly, to an apparatus and method for sensing a condition of a vehicle tire.

BACKGROUND OF THE INVENTION

Numerous tire pressure monitoring systems have been developed in order to detect when the air pressure within a tire drops below a threshold pressure value. These systems typically include a pressure switch, an internal power source, and a communications link that provides the tire pressure information from a location at each vehicle tire to a central receiver, which may be mounted on the vehicle dashboard. The communications link may be a wired or wireless link.

There has been a n increasing need for tire pressure monitoring systems due to the Use of "run flat" tires in vehicles. These "run flat" tires enable a driver to travel an extended distance after the loss of air pressure within the vehicle tire.

Tire pressure monitoring systems are becoming increasingly complex and are requiring the use of numerous circuit components to achieve desired monitoring characteristics. Examples of tire pressure monitoring systems are disclosed in U.S. Pat. No. 5,285,189, U.S. Pat. No. 5,335,540, U.S. Pat. No. 5,055,826, U.S. Pat. No. 4,311,985, U.S. Pat. No. 5,061,917 and PCT International Application No. PCT/US94/13271.

SUMMARY OF THE INVENTION

The present invention is directed to a tire condition sensor module for a vehicle that includes a tire condition sensor operative to sense a condition of an associated vehicle tire and provide a tire condition signal having a characteristic indicative thereof. A motion detector is operative to detect movement of the associated vehicle tire and provide a motion signal having a characteristic indicating movement of the associated vehicle tire. The sensor module also includes a transmitter which is operative to transmit a tire transmitter signal having a characteristic based on the tire condition signal. A controller has one operating mode responsive to the motion signal in which the controller controls the transmitter to intermittently transmit the tire transmitter signal. The controller has another operating mode, also responsive to the motion signal, in which the controller controls the transmitter to transmit the tire transmitter signal only after the controller determines that the tire condition signal indicates that the sensed tire condition is either above or below a first predetermined tire condition threshold. The controller also controls the tire condition sensor to sense the tire condition of the associated vehicle tire during each of the operating modes.

Another embodiment of the present invention is directed to a method for monitoring a condition of a vehicle tire. The method includes the steps of detecting movement of the vehicle tire and providing a motion signal indicative of detected movement. It is determined whether the motion signal indicates movement of the associated tire. A sensor is periodically activated to sense a condition of the vehicle tire and a tire condition signal having a characteristic indicative thereof is provided. Tire condition data based on the tire condition signal is intermittently transmitted when the motion signal indicates at least a first amount of detected movement. When the motion signal has a characteristic indicating less than the first amount of detected movement, the tire condition data is transmitted only after determining that the tire condition signal indicates the sensed tire condition is either above or below a first predetermined threshold.

BRIEF DESCRIPTION OF THE DRAWINGS

The foregoing and other features and advantages of the invention will become more apparent to one skilled in the art upon consideration of the following description and the accompanying drawings in which.

DESCRIPTION OF AN EXEMPLARY EMBODIMENT

Figure 1:
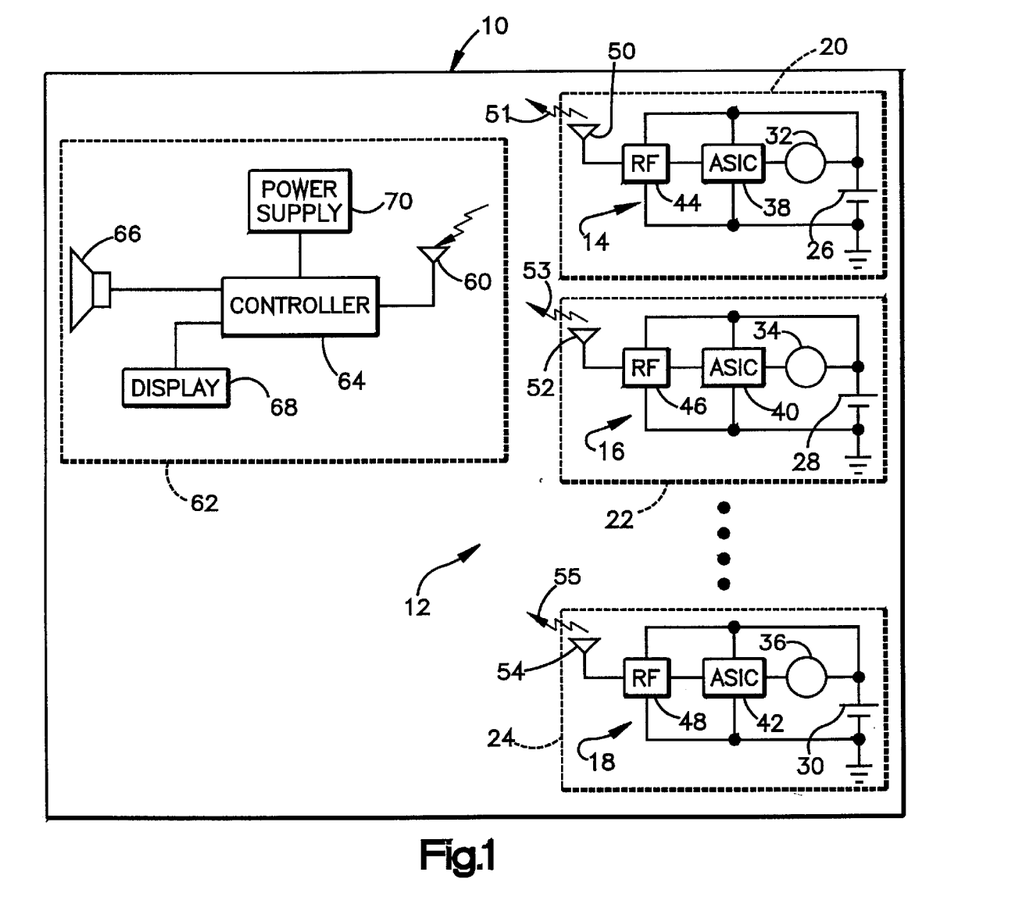
FIG. 1 is a block diagram illustrating a system in accordance with the present invention.

FIG. 1 schematically illustrates a vehicle 10 equipped with a tire condition monitoring system 12 in accordance with the present invention. The system 12 includes a plurality of tire condition sensor modules 14, 16, and 18 for sensing one or more tire conditions of associated vehicle tires 20, 22, and 24, respectively. While for purposes of brevity three modules 14, 16, and 18 are illustrated, there typically is one module associated with each vehicle tire, including any spare tire(s) of the vehicle 10.

Each module 14, 16, 18 includes a respective internal power supply 26, 28, 30 that supplies electrical energy to various circuit components of each associated module. In particular, each power supply 26, 28, 30 is electrically connected to a motion detector 32, 34, 36, respectively. Each power supply 26, 28, 30 also is electrically connected with a controller, such as an application specific integrated circuit (ASIC) 38, 40, 42, and to an RF transmitter 44, 46, 48, respectively. Each motion detector 32, 34, 36 provides a motion signal to the associated ASIC 38, 40, 42 having an electrical characteristic or state that indicates movement of the associated vehicle tire 20, 22, 24. Each ASIC 38, 40, 42 has a plurality of operating modes responsive to the motion signal from its associated motion detector 32, 34, 36. Each ASIC 38, 40, 42, in turn, controls the operation of each module 14, 16, 18 according to the its current operating mode.

As described in greater detail below, each ASIC 38, 40, 42 includes one or more sensors operative to sense one or more conditions of each associated vehicle tire 20, 22, 24 and/or operating parameters of the associated module itself. The sensors provide sensor signals indicative of the condition sensed thereby. The associated ASIC 38, 40, 42 processes the sensor signals to determine desired tire condition data and/or diagnostic information. Each ASIC 38, 40, 42 provides tire condition data and/or diagnostic information to its corresponding transmitter 44, 46, 48. Each transmitter 44, 46, 48, under the control of its respective ASIC 38, 40, 42, provides an encoded data message signal to an associated antenna 50, 52 and 54 indicative of the data received from the ASIC. The antenna 50, 52, 54 transmits or broadcasts the data message as an RF signal through free space, indicated respectively at 51, 53, 55. The data message may include an indication of tire condition, diagnostic information for the associated module, an identification (ID) code of the module, a tire ID code indicating the location of the module relative to the vehicle, etc.

The RF signals 51, 53, and 55 from the modules 14, 16, and 18 are received at an antenna 60 of the receiver module 62. The received signals are decoded by appropriate circuitry of the module 62 and provided to a controller 64. The controller 64 may include the circuitry that decodes or demodulates the signals. Alternatively, the decoder circuitry may be external to the controller 64 and connected between the antenna 60 and the controller.

Preferably, the controller 64 is a microcontroller or microcomputer configured for receiving the tire condition data signals, decoding and processing the received signals, and providing an indication of the received tire condition information. For example, the controller 64 is electrically connected to a speaker 66 for, when appropriate, providing an audible indication, e.g., a warning signal, based on the information contained in the data messages. Alternatively or in addition to the speaker 66, the controller 64 is connected to a display 68 that provides a visual indication of the received tire condition and diagnostic information. The display 68, for example, may be an LED or LCD display of known configuration for displaying detailed tire condition information for each vehicle tire as sensed by the tire condition sensor modules 14, 16, and 18.

The controller 64, the associated display 68, and speaker 66 are powered by a power supply 70. The power supply may be a vehicle battery, such as when the receiver module 62 is mounted within the vehicle 10. The receiver module 62 alternatively might be powered by an internal power supply. It is also contemplated that the receiver module 62 may be a hand-held, portable device or fob that a vehicle occupant or other individual may carry to obtain an audible and/or visual indication of the tire condition and/or diagnostic information.

While, in accordance with one embodiment of the present invention, the communications link between the modules 14, 16, and 18 and the receiver 62 has been described as being an RF link, other wireless communication links could be used in accordance with the present invention.

Figure 2:
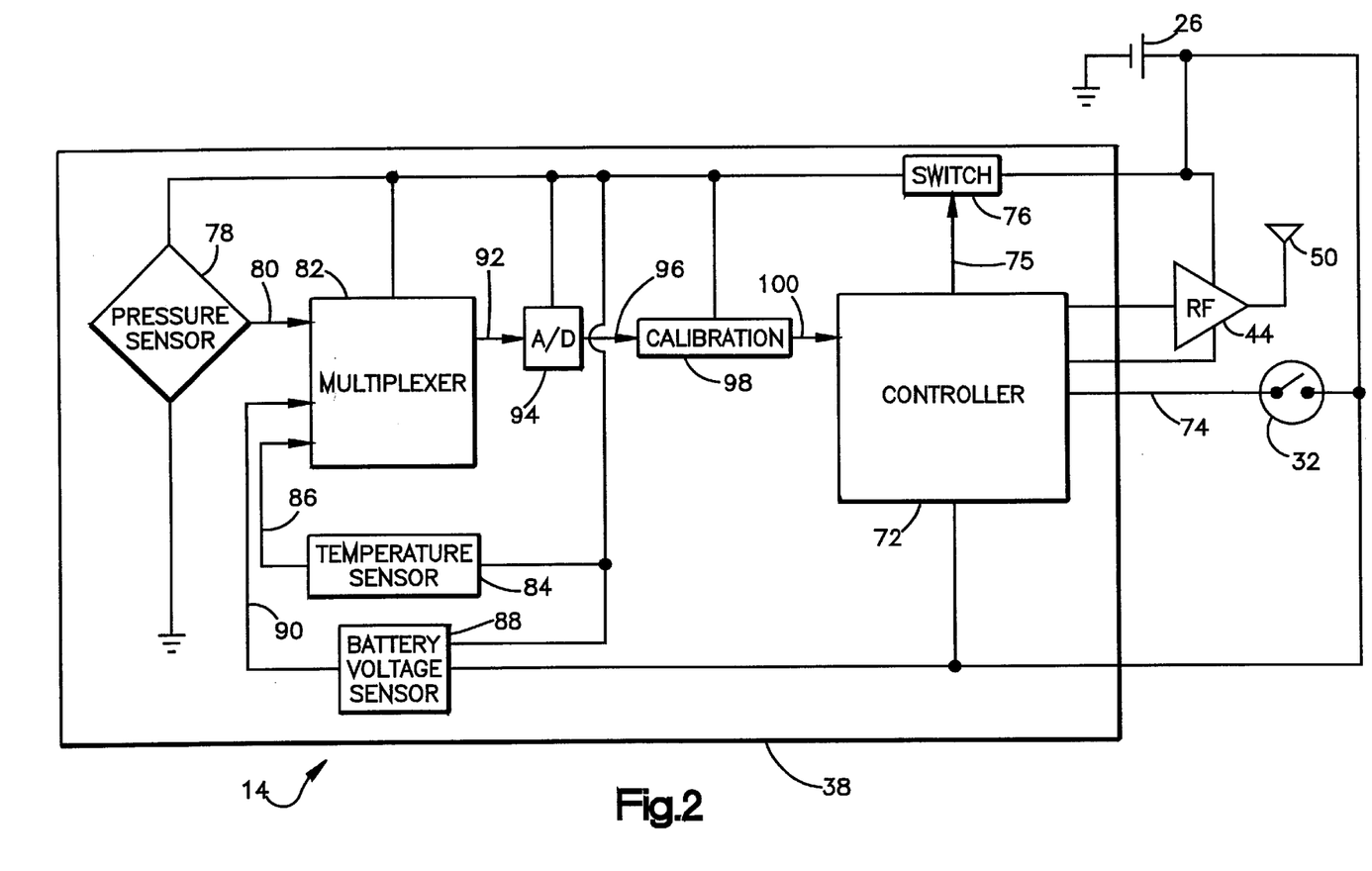
FIG. 2 is a schematic block diagram of a sensor module of the system of FIG. 1.

FIG. 2 illustrates the tire condition sensor module 14 of FIG. 1 in accordance with an exemplary embodiment of the present invention. Identical reference numbers refer to parts of the module 14 previously identified with respect to FIG. 1. The sensor module 14 may be integrated in a single package, operating as a stand alone unit for use with the associated vehicle tire (e.g., 20 of FIG. 1).

The sensor module 14 includes sensor components which are operative to sense various conditions of the vehicle tire and/or to obtain diagnostic information of the module 14. In accordance with an exemplary embodiment of the present invention, the tire conditions include tire pressure and temperature and the diagnostic information includes battery voltage. It is also contemplated that other parameters of the tire and/or of the module also may be monitored in accordance with the present invention. The transmitter 44 of the module 14 broadcasts a data message signal indicative of the sensed parameters, such as in a serial data format, for receipt by the central receiver (e.g., 62 of FIG. 1).

As stated above, the motion detector 32 detects movement of the associated vehicle tire (e.g., 20 of FIG. 1), such as in response to rotation or vibration thereof. Specifically, the motion detector 32 is connected to a controller 72 of the ASIC 38 via connection 74. The motion detector 32 provides a signal to the controller 72 in response to the detected movement.

For example, the motion detector 32 is in the form of a normally open centrifugal switch that closes upon the associated vehicle tire 20 rotating at a predetermined rate. For example, the centrifugal switch closes when the associated tire rotates at a rate corresponding to a vehicle speed of about 10 mph or greater. When the centrifugal switch is closed, it provides a motion signal to the controller 72, such as a logic HIGH signal at a predetermined voltage. The logic HIGH motion signal indicates that the associated vehicle tire (e.g., 20 of FIG. 1) is rotating at a rate corresponding to at least the predetermined vehicle speed. On the other hand, when the centrifugal switch is open, such as for vehicle speeds less than about 10 mph, a logic LOW motion signal of a predetermined voltage, e.g. zero volts, is provided to the controller 72. This indicates either the absence of vehicle movement or movement at a speed less than the predetermined vehicle speed.

The controller 72, for example, may be a microcontroller, a microprocessor, a state machine, discrete components, another ASIC or any combination thereof. The controller 72 controls operation of the module 14. The function of the controller 72 could be implemented as hardware and/or software.

The controller 72 sets an operating mode or state of the module 14 in response to the motion signal received over 74 as well as in response to other criteria. The controller 72 tracks the state of various flag conditions that vary based on monitored parameters, such as pressure, temperature, battery voltage and motion of the associated vehicle tire. The controller 72 controls transitions between operating modes according to the particular value of each of the flag conditions. The controller 72 also controls the timing of tire condition measurements and the timing transmission of data messages.

The controller 72 has an output 75 connected to a control switch 76 for controlling activation of other components of the sensor module 14. In particular, the control switch 76 has an input electrically connected to the power supply 26, such as through an appropriate filter and/or voltage regulator (not shown). The switch 76 also has an output connected to various circuit components located within the ASIC 38. The circuit components could, in accordance with the present invention, be located external to the ASIC 38.

While, for purposes of brevity, a single switch 76 is illustrated as connecting components to the power supply 26, the controller 72 alternatively could control each of the components through separate switches or an appropriate switching matrix. The switches may be located external to the controller 72, such as shown with switch 76 in FIG. 2. Alternatively, one or more switches may be integrated as part of the controller 72 so as to provide desired electrical energy to selected components.

A pressure sensor 78 that is operative to sense tire pressure of the associated vehicle tire (e.g., 20 of FIG. 1) is connected to the switch 76. The pressure sensor 78 provides a tire pressure signal 80 to an input of a multiplexer circuit 82 indicative of the sensed tire pressure. In particular, the pressure sensor 78 provides the tire pressure signal 80 when activated by the control switch 76. The pressure sensor 78, for example, may be an analog pressure sensing device, such as a Wheatstone bridge, that provides a signal having an electrical characteristic (e.g., a voltage differential) indicating an absolute relative pressure detected by the sensor 78. The pressure sensor 78 is capable of sensing pressure within a range, for example, from about 50 kPa to about 640 kPa over a wide temperature range.

A temperature sensor 84 also is connected to the switch 76 and to an input of the multiplexer circuit 82. The temperature sensor 84 provides a signal 86 to the multiplexer circuit 82 having an electrical characteristic indicative of the sensed temperature of the associated vehicle tire. The controller 72 controls operation of the temperature sensor 84 through activation of the control switch 76.

A battery voltage sensor 88 is electrically connected between the internal power supply 26 and an input of the multiplexer circuit 82. The voltage sensor 88 samples the voltage of the power supply 26 upon activation of the control switch 76 by the controller 72. The voltage sensor 88 provides a battery voltage signal 90 to the multiplexer circuit 82 having an electrical characteristic indicative of the sensed voltage. The value of the battery voltage signal 90 after each broadcast provides a good indication of the electrical energy available in the power supply 26.

The multiplexer circuit 82 thus receives parallel input signals 80, 86 and 90 from the respective sensing components 78, 84 and 88. The multiplexer circuit 82, in turn, provides a multiplexed serial output signal 92, indicative of the sensed parameters from each of the sensors 78, 84 and 88. The controller 72 also could be connected to the multiplexer circuit 82 to further control the multiplexing function thereof. The multiplexed data signal 92 is provided to an analog-to-digital converter (A/D) 94 which provides a digitized output signal 96 to a calibration function 98. Alternatively, the signals from the sensors 78, 84, and 88 could be digitized prior to being provided to the multiplexer circuit 82.

The calibration function 98, which may be hardware and/or software, is configured to de-multiplex the digitized data signal 96 received from ADC 94 and calibrate the data into a readable format for the controller 72. For example, the calibration function 98 may include a plurality of pressure curves, temperature curves and/or look-up tables from which calibrated temperature and pressure values are determined based on the information contained in the digitized data signal 96. The look-up table and curves are derived from empirical data over a wide range of temperature and pressure for the particular pressure and temperature sensors 78 and 84 being used. The calibration function 98 also includes a look-up table for converting the digitized voltage signal into a calibrated voltage value in a useable format.

The calibration block 98 provides a calibrated output signal 100 to another input of the controller 72. The signal 100 has a characteristic or value indicative of each of the sensed parameters, e.g., pressure, temperature, and battery voltage. The controller 72 receives the calibrated data signal 100 and stores at least some of the received data in appropriate memory (not shown).

The controller 72 also is programmed with a unique identification (ID) code for the transmitter 44 of the module 14 and, optionally, a tire ID code. The transmitter ID code is set at the manufacturer. The tire ID code may be set at the factory or by a technician who installs the module. The tire ID code is set to indicate the tire location of the module 14 relative to the vehicle.

The controller 72 is electrically connected with the transmitter 44 for controlling transmissions of the data message through the associated antenna 50. The broadcast of the data message signal occurs at selected times based on the particular operating mode of the ASIC 38. The controller 72 determines the operating mode of the ASIC 38 in response to both the motion signal received over connection 74 and in response to the sensed parameters indicated by the calibrated output signal 100.

The controller 72 has a first operating mode, hereinafter referred to as the normal operating mode, in response to the motion signal indicating at least a predetermined rate of rotation of the associated vehicle tire, i.e., the centrifugal switch is closed. In the normal operating mode, for example, the controller 72 controls the switch 76 to effect periodic activation of the tire condition sensors 78, 84 and 88 as well as the other circuit components 82, 94 and 98 of the ASIC 38. Accordingly, sensors 78, 84 and 88 periodically sense the tire condition of the associated vehicle tire at a predetermined rate, such as about once every four to ten seconds. Also, in the normal operating mode, the controller 72 controls the RF transmitter 44 to broadcast the data message signal. The broadcast of each data message signal occurs intermittently at random time intervals within a variable time window, such as ranging from about three to about five minutes. This helps to reduce the overlap and interference of data messages from other sensor modules (e.g., 16, 18 of FIG. 1).

When the centrifugal switch 32 is opened, thereby indicating rotation of the vehicle tire at a rate corresponding to less than a predetermined vehicle speed, the controller 72 controls the sensor module 14 to operate in a second, different operating mode. The second operating mode is referred to as a sleep mode.

In the sleep mode, the controller 72 controls the switch 76 to activate each of the tire condition sensors 78, 84, and 88 so as to sense their respective parameters at a periodic rate that is substantially slower than the rate at which corresponding tire conditions are sensed when in the normal operating mode. In the sleep mode, for example, the sensors 78, 84, and 88 are controlled to sense the tire conditions about every 15 minutes.

However, rather than intermittently broadcasting at random time intervals, as in the normal operating mode, the tire condition data signal is broadcast in the sleep mode only after one or more of the sensed tire conditions is determined to be below a predetermined threshold. For example, when in the sleep mode, the controller 72 controls the transmitter 44 to broadcast the tire condition data signal only after first determining that the sensed tire pressure is below a predetermined threshold, such as about 220 kPa or about 18 psi. The broadcasting alternatively could be based on determining that the sensed temperature is at or above some predetermined level or that the sensed battery voltage is below a voltage threshold.

The sleep mode helps to conserve the energy of the internal power supply 26 when the vehicle is parked or otherwise not being used. The sleep mode advantageously still provides for relatively frequent measurements of the tire condition so that upon determining the occurrence of, for example, a low tire pressure condition, this information is provided to the driver upon starting the vehicle as key-on-status information. The restricted broadcasts in the sleep mode further help to reduce interference with other RF communication links of the vehicle, such as a remote keyless entry system, that typically occur when the vehicle is stationary. Other operating modes also may be used to control the frequency of parameter measurements as well as transmission of the data message signals.

In view of the foregoing structure, the operation of the tire pressure sensor module 14 is better appreciated with reference to the exemplary flow diagrams of FIGS. 3–6. While FIGS. 3–6 represent the operational flow of a step-by-step process in accordance with an exemplary embodiment of the present invention, the process could also be implemented in various other ways. FIG. 7, for example, illustrates a state diagram for the operation of the module 14 of FIG. 2. The state diagram has been provided to illustrate various operating modes or states and transitions between such operating modes in accordance with the present invention. This state diagram is considered to be self-explanatory, especially after the following description of FIGS. 3–6.

Figure 3:
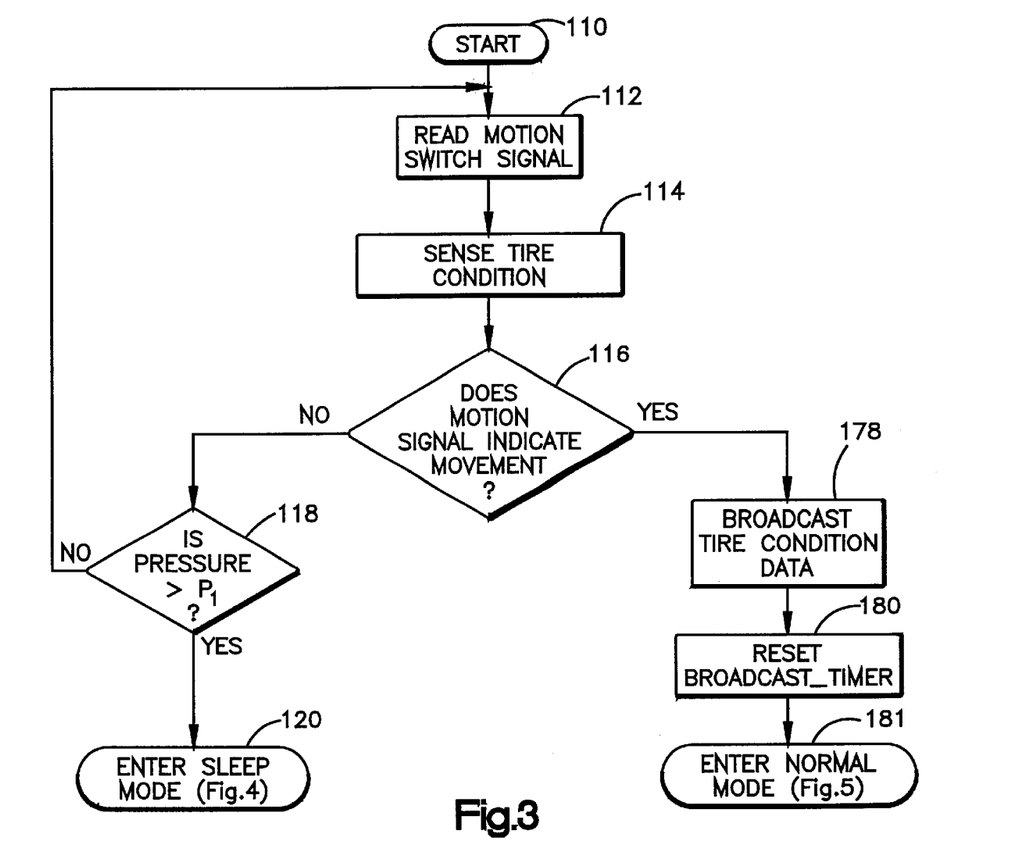
FIG. 3 is a flow diagram illustrating the operation of the sensor module of FIG. 2 in accordance with the present invention.

Referring to FIG. 3, the process begins at step 110 in which the module 14 is powered up and all registers are cleared, parameters are initialized and flag conditions are reset to appropriate starting values. The process proceeds to step 112 in which the motion signal from the motion detector 32 is read.

The process then proceeds to step 114 in which the tire condition is sensed, including tire pressure, temperature, and/or battery voltage. As stated above, this is accomplished by the controller 72 activating the control switch 76 to provide electrical power to the pressure sensor 78, temperature sensor 84, the voltage sensor 88, and other circuit components of the ASIC 38. The sensed tire pressure information is provided as pressure signal 80, the temperature information is provided as temperature signal 86 and the battery voltage information is provided as signal 90.

The process proceeds to step 116 in which a determination is made whether the motion signal indicates at least a predetermined amount of tire movement. As stated above with respect to FIG. 2, for example, the motion detector 32 is formed of a normally open centrifugal switch that closes in response to the associated vehicle tire rotating at a rate corresponding to a vehicle speed above a predetermined threshold, such as about 10 MPH. When the centrifugal switch 32 is opened, thereby indicating that the vehicle is moving at a speed below this predetermined threshold, the process proceeds to step 118.

In step 118, another determination is made whether the calibrated representation of the sensed tire pressure (e.g., based on the pressure signal 80) is greater than a predetermined threshold pressure $P_1$. The threshold pressure $P_1$ is selected to provide a nominal pressure value, such as about 220 kPa or 18 psi, which indicates that the tire sensor module 14 has been exposed to a pressurized environment, i.e., mounted within a pressurized vehicle tire. If, at step 118, it is determined that the sensed pressure is not greater than the threshold pressure $P_1$ for at least a predetermined time period, the process returns to step 112. This is indicative of a storage mode that is conducive for transportation and/or storage of uninstalled modules. The sensor module 14 initially operates in the storage mode in which the module is dormant until one or more sensed conditions provide for a transition to a different operating mode.

On the other hand, if the determination at step 118 is affirmative, indicating that the sensed pressure is greater than the pressure threshold $P_1$ for at least the predetermined time period, the process proceeds to step 120. In step 120, the process enters the sleep mode shown in FIG. 4.

Figure 4:
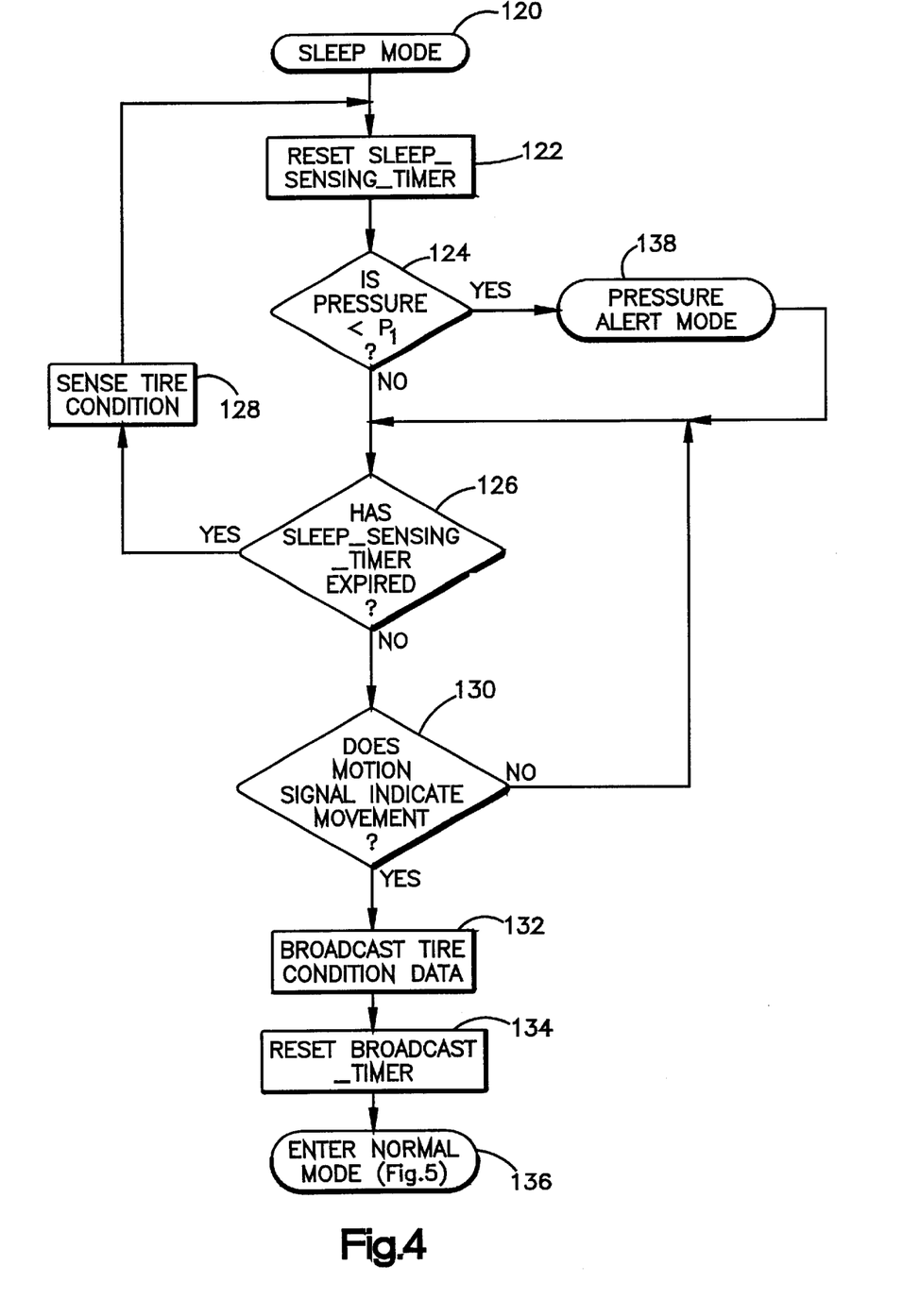
FIG. 4 is a flow diagram illustrating operation of the sensor module of FIG. 2 in a first mode.

Referring to FIG. 4, the process continues to step 122 in which a SLEEP_SENSING_TIMER is reset. The SLEEP_SENSING_TIMER provides a time interval, such as about fifteen minutes, for controlling subsequent activation of at least some of the tire condition sensors 78, 84 and/or 88 by the controller 72. After the SLEEP_SENSING_TIMER is reset, the process then proceeds to step 124.

At step 124, the controller 72 determines whether the calibrated value of the sensed tire pressure is less than a predetermined threshold pressure. Preferably, this threshold pressure is the same as the threshold pressure $P_1$ of step 118 of FIG. 3, namely about 220 kPa. If it is determined that the calibrated value of the sensed tire pressure is not below the threshold pressure $P_1$, the process proceeds to step 126.

At step 126, a determination is made whether the SLEEP_SENSING_TIMER has expired. If it is determined that the SLEEP_SENSING_TIMER timer has expired, the process proceeds to step 128. At step 128, tire condition parameters are sensed. In particular, the controller 72 activates the switch 76 to electrically connect the pressure sensor 78 to the power supply 26 so as to obtain a measure of the current tire pressure. The controller 72 also may activate the switch 76 to effect operation of the temperature sensor 84 and the battery voltage sensor 88 upon expiration of the SLEEP_SENSING_TIMER. The process then returns to step 122.

If the determination in step 126 is negative, thereby indicating that the SLEEP_SENSING_TIMER has not expired, the process proceeds to step 130. At step 130, another determination is made whether the motion signal indicates movement of the associated vehicle tire 20. That is, the controller 72 receives the motion signal via connection 74 and determines whether the motion signal indicates movement of the vehicle at or above a predetermined vehicle speed, such as about 10 mph. In the event that the motion signal does not indicate such vehicle movement, the process returns to step 126.

On the other hand, if the determination at step 130 is affirmative, wherein the motion signal indicates that the vehicle is moving at a speed at or above the predetermined vehicle speed, the process proceeds to step 132. At step 132, the controller 72 controls the transmitter 44 to broadcast the tire condition data signal. The tire condition data signal has a characteristic indicative of, for example, calibrated tire pressure information, calibrated temperature information, an indication of the current operating mode, information indicating the condition of the power supply 26, identifying information of the sensor module 14 (e.g., transmitter ID code), as well as error detection information.

The process then proceeds to step 134 in which a BROADCAST_TIMER is reset. The BROADCAST_TIMER defines a time interval, such as a random interval ranging from about 3 to about 5 minutes, which controls the duration between subsequent broadcasts of the tire condition data signal by the transmitter 44 when in the normal operating mode. The process then proceeds to step 136 in which the process enters the normal operating mode of FIG. 5, described below.

Referring back to FIG. 3, if the determination at step 116 is affirmative, thereby indicating movement of the vehicle above the predetermined vehicle speed, the process proceeds to step 178. At step 178, selected tire condition data is broadcast. The process then proceeds to step 180 in which the BROADCAST_TIMER is set. The process then proceeds to step 136 in which the process enters the normal operating mode.

The broadcasting steps 132 and 178 and the steps of resetting of the BROADCAST_TIMER 134 and 180 are precursors to entering the normal operating mode at step 136, although such steps also could be implemented as part of the normal operating mode. The transition from either the storage mode or the sleep mode into the normal operating mode occurs in response to the controller 72 determining the existence of vehicle movement (i.e., the centrifugal switch is closed) for at least a predetermined time period.

Refer back to step 124 of the sleep mode shown in FIG. 4. If the determination at step 124 is affirmative, thereby indicating that the controller 72 has determined that the calibrated, sensed tire pressure is less than the pressure threshold $P_1$, the process proceeds to step 138. At step 138, the process enters a pressure alert operating mode, shown in FIG. 6. The pressure alert mode is a sub-routine of the main process in which selected tire condition data is broadcast in a predefined manner.

Figure 6:
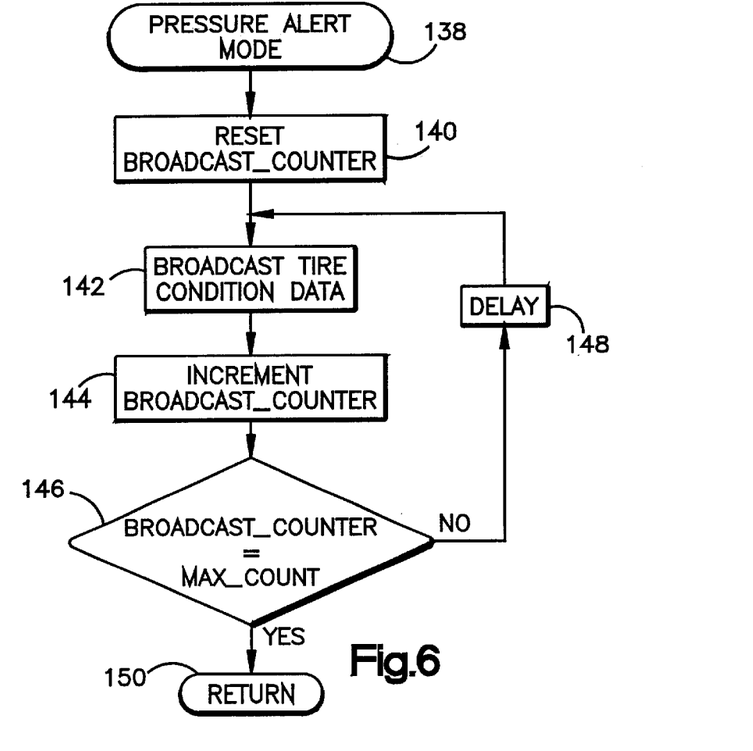
FIG. 6 is a flow diagram illustrating operation of the sensor module of FIG. 2 in a third mode.
Figure 7:
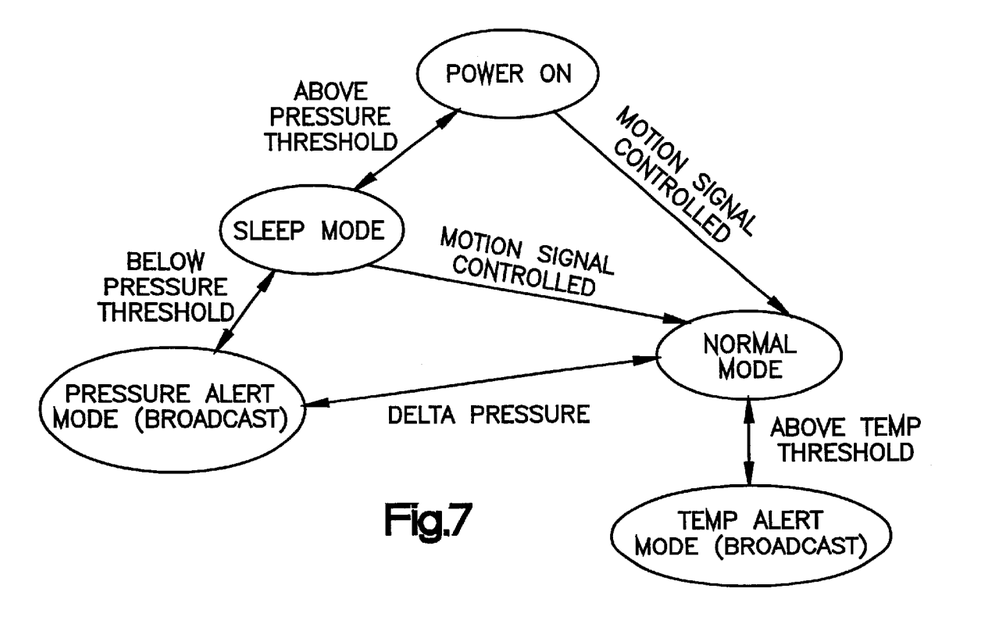
FIG. 7 is a state diagram illustrating the operation of the sensor module of FIG. 2 in accordance with the present invention.

With reference to FIG. 6, the pressure alert mode continues to step 140 in which a BROADCAST_COUNTER is reset. The BROADCAST_COUNTER defines the number of broadcasts of the tire condition data signal and/or a time period during which the tire condition data signal is broadcast. For example, the tire condition data signal is broadcast a predetermined number of times defined by the BROADCAST_COUNTER, such as about four times within about a one minute interval.

The process proceeds to step 142 in which the tire condition data signal is broadcast, as described above. After broadcasting the tire condition data signal, the process then proceeds to step 144 in which the BROADCAST_COUNTER is incremented. As a matter of design choice, the counter also could be configured to be decremented until a predetermined minimum counter value is reached. Alternatively, the BROADCAST_COUNTER could be implemented as a timer of a predetermined duration.

The process then proceeds to step 146 in which a determination is made whether the BROADCAST_COUNTER has reached a maximum count value (MAX_COUNT). If the determination in step 146 is negative, indicating that the BROADCAST_COUNTER has not reached the MAX_COUNT value, the process proceeds to step 148 in which a predetermined time delay, such as at least about 15 seconds, is imposed prior to the next broadcast of the tire condition data signal during the pressure alert mode. In this way, each broadcast in the pressure alert mode is spaced apart by a time period provided by the delay of step 148. The process then returns to step 142 for another broadcast of the tire condition data signal.

If the determination at step 146 is affirmative, thereby indicating that the BROADCAST_COUNTER has reached the MAX_COUNT value, the process proceeds to step 150. At step 150, the process returns to the operating mode which called the pressure alert subroutine. In this example, the process returns to step 126 of the sleep mode (FIG. 4) to determine whether the SLEEP_SENSING_TIMER has expired.

Figure 5:
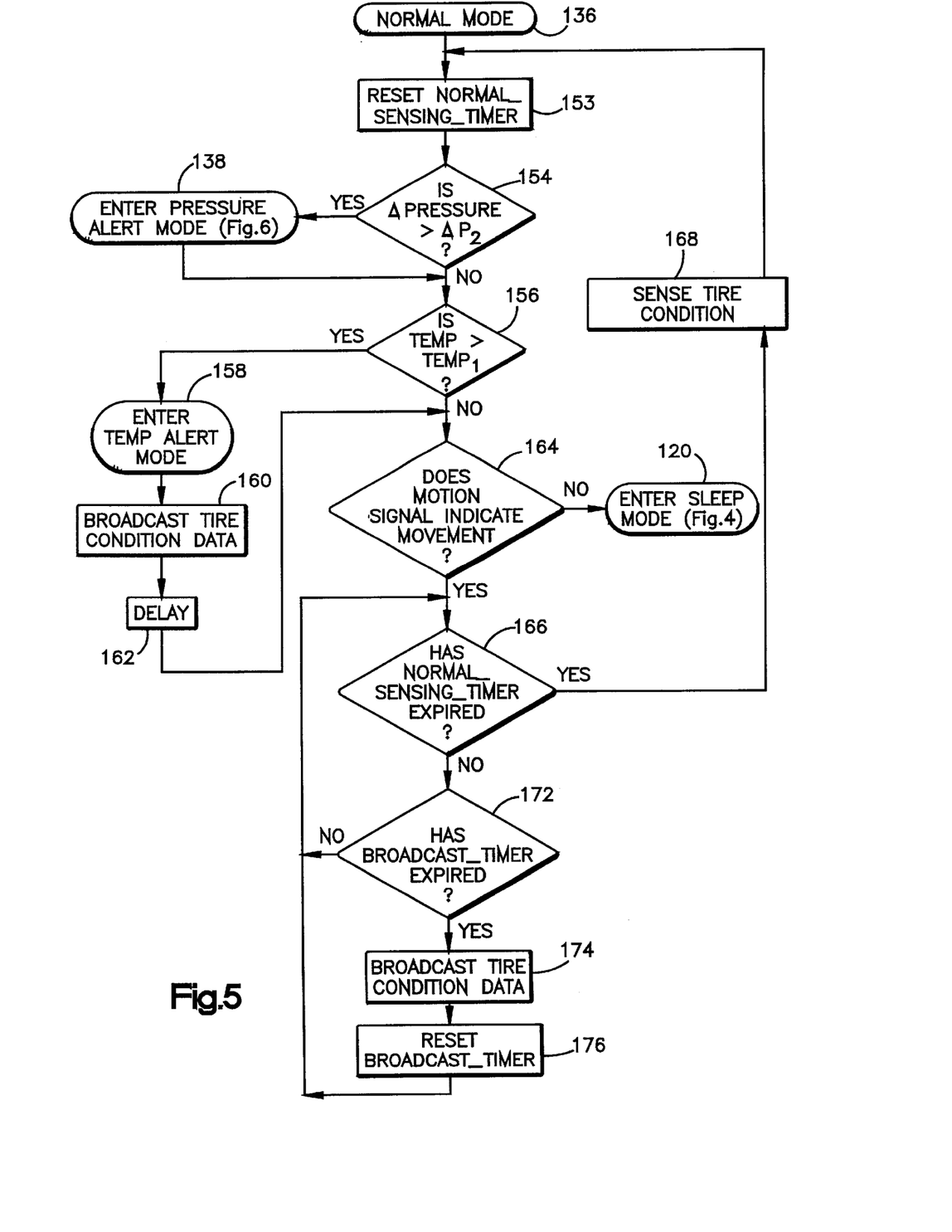
FIG. 5 is a flow diagram illustrating operation of the sensor module of FIG. 2 in a second mode.

FIG. 5 illustrates operating characteristics of the module 14 for the normal operating mode. As mentioned above, the normal operating mode is active when the vehicle is moving above the predetermined threshold speed, e.g. 10 MPH. The normal operating mode begins at step 136 after the controller determines that the motion signal indicates vehicle movement, such as at step 116 or step 130. Typically, before entering the normal operating mode, the tire condition data is broadcast (step 178, 132) and the BROADCAST_TIMER is reset (step 180, 134). Such steps, alternatively, may be performed contemporaneous with or after entering the normal operating mode.

The process proceeds to step 153 in which a NORMAL_SENSING_TIMER is reset. The NORMAL_SENSING_TIMER is implemented within the controller 72 as a timer of a predetermined duration. The controller 72 controls activation of the tire condition sensors 78, 84, and 88 during the normal operating mode in response to expiration of this timer.

After resetting the NORMAL_SENSING_TIMER, the process proceeds to step 154. At step 154, a determination is made whether a change in the sensed tire pressure, indicated at ΔPRESSURE, is greater than a predetermined pressure threshold $\Delta P_2$, such as about 15 kPa or 2 psi. In particular, ΔPRESSURE is defined by:

$$\Delta \text{Pressure} = |\text{PRESSURE}_t - \text{PRESSURE}_{t-1}|,$$

where $\text{PRESSURE}_t$ is the current measurement of the sensed tire pressure and $\text{PRESSURE-}_{t-1}$ is a reference value of the last tire pressure measurement that was broadcast in the tire condition data signal. The $\text{PRESSURE}_{t-1}$ value is stored in appropriate memory of the controller 72 after each broadcast. Accordingly, with each broadcast of the tire condition data signal, the reference value $\text{PRESSURE}_{t-1}$ is replaced by the pressure value being broadcast.

If it is determined that the ΔPRESSURE is greater than the threshold $\Delta P_2$, the process proceeds to step 138 in which the process enters the pressure alert mode of FIG. 6. The pressure alert mode is entered, for example, after the controller 72 determines at least a 15 kPa difference between the current pressure measurement $\text{PRESSURE}_t$ and the reference pressure measurement $\text{PRESSURE}_{t-1}$. The pressure alert mode is identical to that described above with respect to the sleep mode (FIG. 4), except that, after broadcasting the tire condition data signal for the maximum number of broadcasts, the process returns to the normal operating mode (FIG. 5) from which it originated. That is, the return step 150 of the pressure alert mode (FIG. 6), returns the process to step 156 of the normal operating mode.

When the determination of step 154 is negative, thereby indicating that the ΔPRESSURE is not greater than the threshold $\Delta P_2$, the process also proceeds to step 156. At step 156, the controller 72 determines whether the calibrated value of the sensed temperature (TEMP) is greater than a threshold temperature ($\text{TEMP}_1$), such as about 80° C. If the determination of step 156 is affirmative, thereby indicating that the sensed temperature TEMP is greater than the threshold temperature $\text{Temp}_1$, the process proceeds to step 158. At step 158, a temperature alert mode or subroutine is entered.

For purposes of brevity, the temperature alert mode has been included as part of FIG. 5. The temperature alert mode advances to step 160 in which the tire condition data signal is broadcast. Preferably, a predetermined number of broadcasts are executed while in the temperature alert mode, similar to the pressure alert mode of FIG. 6. After the predetermined number of broadcasts of the tire condition data have been executed (step 160), the process proceeds to step 162 in which a predetermined time delay is imposed. This time delay preferably prevents only re-entering the temperature alert mode (step 158) for a duration of time at least equal to the length of the delay. Accordingly, other operational features of the module still continue while this delay (step 162) is being executed.

While applying the delay (step 162) for the temperature alert mode, the process returns to step 164 of the normal operating mode. In addition, if the determination of step 156 is negative, thereby indicating that the calibrated value of the sensed temperature TEMP is not greater than the threshold temperature $TEMP_1$, the process also proceeds to step 164.

At step 164, the controller 72 determines whether the motion signal indicates vehicle movement at or above a predetermined vehicle speed. If the determination of step 164 is negative, thereby indicating that the vehicle is moving at a speed below the predetermined vehicle speed, the process proceeds to step 120, thereby entering the sleep mode shown in FIG. 4.

On the other hand, if the determination at step 164 is affirmative, indicating that the vehicle remains moving at or above the predetermined vehicle speed, the process proceeds to step 166. At step 166, a determination is made whether the NORMAL_SENSING_TIMER has expired. When the NORMAL_SENSING_TIMER expires, the controller 72 controls the control switch 76 to provide electrical power to the sensors 78, 84, and 88 to measure corresponding tire condition and diagnostic parameters.

If the determination of step 166 is affirmative, indicating expiration of the NORMAL_SENSING_TIMER, the process proceeds to step 168. At step 168, the tire condition and diagnostic parameters are sensed, including the tire pressure, temperature and battery voltage, as described above. The process then returns to step 153 in which the sensing NORMAL_SENSING_TIMER is reset. Thus, each time the sensing NORMAL_SENSING_TIMER expires, the controller 72 controls the sensors 78, 84, and 88 to sense the tire pressure, temperature, and the battery voltage.

If the determination in step 166 is negative, indicating that the sensing NORMAL_SENSING_TIMER has not yet expired, the process proceeds to step 172. In step 172, another determination is made whether the BROADCAST_TIMER has expired. In the event that the BROADCAST_TIMER has not expired, the process returns to step 166. On the other hand, if the BROADCAST_TIMER has expired, the process proceeds to step 174.

At step 174, the tire condition data signal is broadcast, such as stated above. The process then proceeds to step 176 in which the BROADCAST_TIMER is reset. Preferably, the BROADCAST_TIMER is reset to a random amount of time within a variable window, such as between about three and five minutes. This enables the transmitter 44 to intermittently broadcast the tire condition data signals at random time intervals during the normal operating mode. Accordingly, when in the normal operating mode, the tire pressure sensing module 14 effects broadcast of the tire condition data signal each time the BROADCAST_TIMER expires, unless the process enters a different operating mode prior to expiration of the BROADCAST_TIMER. After resetting the BROADCAST_TIMER (step 176), the process returns to step 166.

While, for simplicity of explanation, process of FIGS. 3–6 have been described to occur as a sequence of steps, changes between operating modes or states may occur regardless of the current function being executed within the ASIC, such as according to the state diagram of FIG. 7. System operation also may vary depending on the particular implementation chosen.

From the above description of the invention, those skilled in the art will perceive improvements, changes and modifications. Such improvements, changes and modifications within the skill of the art are intended to be covered by the appended claims.

Having described the invention, the following is claimed:

1. A tire condition sensor module for a vehicle comprising:
    a source of electrical energy;
    at least one actuatable tire condition sensor operative to sense a tire condition of an associated vehicle tire and to provide a tire condition signal indicative of the condition sensed;
    a motion detector operative to detect movement of the associated vehicle tire and to provide a motion signal having a characteristic indicating movement of the associated vehicle tire;
    a transmitter operative to transmit a tire condition indicating signal having a characteristic based on the tire condition signal; and
    a controller for controlling actuation of said at least one tire condition sensor and for controlling said transmitter, said controller being continuously energized from said source of electrical energy and having first and second operating modes, said controller (i) operating in said first operating mode when the motion signal indicates movement of the associated tire that is greater than a predetermined value and (ii) operating in said second operating mode when the motion signal indicates movement of the associated tire that is less than the predetermined value,
    said controller intermittently actuating said at least one tire condition sensor to sense the tire condition and controlling said transmitter to periodically transmit the tire condition indicating signal when said controller is operating in said first operating mode, and said controller intermittently actuating said tire condition sensor to sense the tire condition and controlling said transmitter to transmit the tire condition indicating signal only if said controller determines that the tire condition signal indicates that the sensed tire condition is indicative of an alert condition when said controller is operating in said second operating mode.

2. The module as set forth in claim 1 wherein said controller, when operating in said second operating mode, actuates said tire condition sensor at a rate that is less than a rate at which said controller actuates said tire condition sensor when operating in said first operating mode.

3. The module as set forth in claim 1 wherein said controller, when operating in said first operating mode, increases a rate of transmission of the tire condition indicating signal upon a determined difference of at least a predetermined amount between the sensed tire condition and a reference tire condition.

4. The module as set forth in claim 3 wherein the reference tire condition is an immediately preceding transmitted tire condition indicating signal.

5. The module as set forth in claim 1 wherein said controller controls a time period between and a predetermined number of transmissions of said transmitter.

6. The module as set forth in claim 1 wherein said controller, when in said second operating mode, controls said transmitter to periodically transmit the tire condition indicating signal for a predetermined time period when the tire condition signal indicates that the sensed tire condition is indicative of the alert condition.

7. The module as set forth in claim 1 wherein said controller, when in said second operating mode, controls said transmitter to transmit the tire condition indicating signal a predetermined number of times when the tire condition signal indicates that the sensed tire condition is indicative of the alert condition.

8. The module as set forth in claim 1 further including an actuatable control switch electrically connected to said source of electrical energy and said tire condition sensor, said controller controlling actuation of said at least one tire condition sensor by controlling said actuatable control switch.

9. The module as set forth in claim 1 wherein said tire condition is air pressure.

10. The module as set forth in claim 9 wherein said alert condition occurs when the sensed air pressure in the associated vehicle tire is less than a predetermined value.

11. The module as set forth in claim 9 wherein said alert condition occurs when the sensed air pressure in the associated tire drops by a predetermined value.

12. A method for monitoring a condition of a vehicle tire, said method comprising the steps of:

continuously energizing a controller from a source of electrical energy;

detecting movement of the vehicle tire;

providing a motion signal in response to detected movement to said controller;

determining whether the motion signal indicates movement of the vehicle tire;

operating the controller in a first operating mode when the motion signal indicates movement of the vehicle tire that is greater than a predetermined value and operating said controller in a second operating mode when the motion signal indicates movement of the vehicle tire that is less than the predetermined value;

intermittently sensing a condition of the vehicle tire on a continuing basis and providing a tire condition signal indicative of the condition sensed to said controller;

periodically transmitting a tire condition indicating signal having a characteristic based on the tire condition signal when said controller is operating in said first operating mode; and transmitting the tire condition indicating signal only if said controller determines that the tire condition signal indicates that the sensed tire condition is indicative of an alert condition when said controller is operating in said second operating mode.

13. The method as set forth in claim 12 wherein the step of intermittently actuating said tire condition sensor further includes the steps of:

actuating said tire condition sensor at a first rate when said controller is operating in said first mode of operation, and actuating said tire condition sensor at a second rate, that is less than the first rate, when said controller is operating in said second mode of operation.

14. The method as set forth in claim 12 wherein the step of periodically transmitting the tire condition indicating signal further includes the steps of:

storing a reference value for a predetermined tire condition;

comparing a value of the tire condition signal with the reference value; and increasing a rate of transmission of said tire condition indicating signal, when the controller is operating in said first operating mode and upon determining a difference of at least a predetermined amount between the sensed tire condition and the reference value.

15. The method as set forth in claim 12 wherein the step of intermittently actuating said tire condition sensor further includes the step of varying a rate of actuation of said tire condition sensor in response to the motion signal.

16. The method as set forth in claim 12 wherein the step of intermittently sensing the condition of the tire includes the step of intermittently actuating a control switch to intermittently provide electrical energy to a tire condition sensor.

17. The method as set forth in claim 12 wherein the step of intermittently sensing a condition of the vehicle tire includes the step of sensing air pressure in the tire.

* * * * *